3,511,705
PROCESS FOR THE PRODUCTION OF INVERT SUGAR SOLUTIONS FROM MOLASSES

Erich Haack, Heidelberg, and Franz Braun, Ludwigshafen (Rhine), Oppau, Germany, assignors to C. F. Boehringer & Soehne GmbH, a corporation of Germany
No Drawing. Filed Feb. 28, 1967, Ser. No. 619,196
Claims priority, application Germany, Mar. 15, 1966, B 86,203; Nov. 19, 1966, B 89,907
Int. Cl. C13k 3/00, 1/04; C13j 1/08
U.S. Cl. 127—41          19 Claims

ABSTRACT OF THE DISCLOSURE

Process for the production of pure invert sugar solutions from molasses by subjecting molasses to an acid hydrolysis as for example by treating the molasses with HCl or $H_2SO_4$ (pH=1–4) at a temperature of about 60–105° C. for about 20 minutes to 2 hours and after the hydrolysis either neutralizing the mixture using for instance NaOH or KOH solution and thereafter introducing the neutralized molasses preparation into a suitably dimensioned chromatographic column filled with a cation exchange resin in salt form as for example a nuclear sulfonated polystyrene resin cross-linked with 4% divinyl benzene which has been charged with Na or K ions or directly following the hydrolysis introducing the hydrolyzed molasses into the chromatographic separation column. Preferably the chromatographic separation is carried out at a temperature of from 50–100° C. The process in accordance with the invention results in the recovery of a substantially salt-free and color-free solution of monoses, i.e. mixture of about equal amounts of glucose and fructose (invert sugar).

---

The present invention relates to a process for the production of invert sugar solutions from molasses.

Molasses is a by-product in the large-scale production of sucrose from sugar cane juice and sugar beet juice, it being obtained thereby in large amounts. In addition to the non-sugar components of the initial juice, particularly salts, including for the most part potassium salts, as well as nitrogen-containing compounds, molasses contains about 30–55% sucrose and may also contain, as for example, in certain sugar cane molasses, considerable amounts of glucose and fructose (10–30% invert sugar). Other hexoses, pentoses and polyoses preponderantly derived from hexoses, are also present although, to a lesser extent.

The sucrose in molasses cannot be crystallized by the usual methods as the remaining components, and in particular the potassium salts, invert sugar and organic non-sugars, effectively prevent the crystallization of sucrose. As a consequence, the utilization of the sugars present in molasses can only take place by those processes in which the remaining components do not exert a disturbing effect, and mainly, for example, by fermentation to alcohol, citric acid and other readily separable products of bacterial metabolism, or as additives to animal foodstuffs, the by-products present thereby constituting a limiting factor. However, molasses cannot be used directly as a sweetening agent or as a sugar substitute for human consumption.

Because of the high sucrose content and because of the large amounts of molasses produced, numerous attempts have, of course, been made to obtain as such the sucrose present in molasses (see, for example, "Melasse-Entzuckerung in der deutschen Patentliteratur" by Dr. H. Olbrich, Zeitschr. für die Zuckerindustrie, 13, 307–315/1963). Illustrative of the numerous attempts which have been made in this direction, there may be mentioned certain procedures, these being based on three different principles of operation:

(1) Separation of the sucrose by the formation of a sparingly-soluble salt with an alkaline earth metal hydroxide, such as calcium, strontium or barium hydroxide, separation of the resulting precipitate and regeneration thereof to give a sugar solution.

(2) Separation of the salts present by a suitable pretreatment, for example, with sulfuric acid in an organic solvent, such as methanol or ethanol, after which a part of the sucrose can be crystallized from the organic solvent.

(3) Separation of the salts by treatment with cation or anion exchangers, after which the remaining sucrose solution, freed from the salts, can again be crystallized.

However, the aforesaid methods have the following principle disadvantages:

METHOD 1

The precipitation process with alkaline earth metal hydroxides requires large amounts of these hydroxides and, subsequently, large amounts of precipitating agents for the metals, for example, carbon dioxide, sulfuric acid or phosphoric acid must be used. Even when, for example, the precipitated alkaline earth metal carbonates can be regenerated by calcination, a considerable expenditure on auxiliary chemicals and treatment costs is necessary. Furthermore, the sugar solutions obtained are by no means free from impurities, especially from the ions of the alkaline earth metal used, and must be freed from these, for example, by using ion exchangers. In this case, however, a disturbing effect is that ion exchangers in the acidic form, have a hydrolytic action upon sucrose and, in the alkaline form, give rise to discolorations. In addition, the use and the regeneration of ion exchangers is relatively expensive.

METHOD 2

The precipitation of the salts in an organic solvent is, of course, bound up with losses of these solvents and, for this reason alone, leads to considerable expenditure. Furthermore, it is only possible to bring about the crystallization of a part of the sucrose present. Any monoses present, such as glucose and fructose, remain, as in the case of Method 1, in the mother liquors and are thus lost.

METHOD 3

Because of the large amounts of salts present, the use of ion exchangers require a considerable expenditure for the regeneration of the ion exchangers. To this must be added the disadvantages, already mentioned in connection with Method 1, of hydrolysis by acidic exchangers and discoloration by alkaline exchangers, both of which are certainly necessary for complete desalting. Finally, the ion exchangers also become charged, depending upon the nature of the molasses, to a considerable extent with other non-salt-like components of the molasses, especially with coloring substances, and thus frequently are made prematurely useless. Consequently, ion exchanger processes can only be used at a considerable expense outlay for the working up of molasses and, even then because of the frequent interruptions in operation, have not achieved the desired technical importance.

In U.S. Pat. No. 3,174,876, there is described a process for the production of sucrose from molasses which does not depend upon ion exchange but rather depends on the so-called ion-exclusion process. As is known, in the case of the ion-exclusion process (see U.S. Pat. No. 2,890,972), the exchange resin is not used in the acidic or basic form but rather in the salt form, for example, cation exchangers in the potassium form. In this manner, suitably concentrated solutions of molasses can be separated by a conventional charging and eluting process to such an extent that enriched sucrose solutions are obtained which are again capable of crystallization. In this case, it does not necessarily mean that all salts, nitrogen-containing compounds, coloring matter and possibly also monoses are separated from the sucrose, but only that the ability of the sucrose to crystallize is again obtained by removal of the important crystallization-inhibiting materials. The sucrose solutions hereby obtained, which are again capable of crystallization, can then again be introduced into the general processing of a sugar factory, its sugar content thereby only being partially utilized but a part thereof again going into a new amount of molasses which contains all the monoses present. It is thus clear that this new process for producing sucrose can really only be carried out economically in a sugar factory and that it only brings about a partial separation of the impurities from the sucrose. By repeating the process described in U.S. Pat. No. 3,174,876, it has been established that reversible and irreversible chargings of the exchanger material with non-sugars, especially colored components of the molasses, takes place. A part of this coloring matter is again entrained by the water phase in the elution step following the charging and thus contaminates the sucrose fractions. Another part can be leached out as a black lye by a subsequent treatment with hot, strong solutions of alkali metal hydroxides, for example, with potassium hydroxide solution in the case of potassium ion-charged exchanger columns. However, even after this treatment, a substantial residue still remains behind in the exchanger resin and increasingly limits its capacity and further utilization so that, finally, the exchanger must be replaced.

In summary, it can be appreciated that hitherto a completely satisfactory and economic process for the removal of sugar from molasses, with the complete utilization of the sucrose, as well as of the monoses and polyoses, present in the molasses, has not been available.

It is, therefor, an object of the present invention to provide a process which permits a complete utilization of the molasses, the sugar components of the molasses thereby being obtained almost completely in the form of a pure invert sugar solution which can be used directly in foodstuffs or flavoring industries or from which there can be isolated pure sugar which is suitable for human consumption.

Another object of the invention is to provide a method for treating molasses in order to obtain pure invert sugar solutions therefrom.

Various other objects, advantages and features of the invention will become apparent to one skilled in the art upon consideration of the accompanying disclosure.

The instant invention resides in a process for obtaining pure invert sugar solutions from molasses, wherein molasses is first subjected to an acidic hydrolysis, then neutralized and subsequently separated chromatographically, in known manner, on a cation exchange resin column in the salt form.

It was not foreseen that the combination of these process steps would lead to the desirable and advantageous results herein realized because, on the one hand, it was known that the colored accompanying substances in the molasses led to difficulties in the chromatographic separation on ion exchangers and, on the other hand, as is also known, in the case of the acidic treatment of molasses, the discoloration increases. Surprisingly, however, it has now been found that, in spite of the stronger coloration of the molasses after the hydrolysis carried out according to the present invention, the ion exchangers are substantially less colored and thus are capable of being used for longer periods of time and that the monoses (preponderantly glucose and fructose) can be collected in separate fractions in a substantially pure form. In particular, it was surprising that this effect is still further strengthened when the hydrolysis is continued for some time beyond that necessary for the complete splititng of sucrose into glucose and fructose.

It has also been found in accordance with the invention that the maintenance of the ion exchanger in a useable form can be still further improved when the molasses is mixed with sulfur dioxide before, during or even after the hydrolysis. By this addition of sulfur dioxide, not only is the molasses lightened but, in particular, the tendency of the coloring matter present to bring about reversible and irreversible discoloration of the ion exchanger resin is still further reduced.

In the case of a pre-treated molasses of this type, the coloring matter passes through the cation exchanger column in the salt form more quickly than the monoses and again emerges from the separating column, together with the organic salts and the nitrogen-containing accompanying materials, before the invert sugar mixture. The coloring matter, which has been changed by the hydrolysis, has, to a large extent, lost the property of bringing about reversible or irreversible discolorations of the ion exchanger. Consequently, a considerably longer period of life of the ion exchange resin is achieved so that a more economical continuous operation is possible and which does not require the frequent interruptions heretofore necessary. The separation of pure invert sugar solutions from the molasses pre-treated in the above-described manner is, in addition, simplified by the greater difference in the migration velocities between monoses and salts, as well as coloring matter, on the one hand, in comparison with sucrose and salts, as well as coloring matters, on the other hand, so that it is possible to work with shorter columns. A further advantage of the process according to the present invention is the making available not only of the sucrose but also of the monosaccharides, especially glucose and fructose, already present before the hydrolysis of the molases.

For carrying out the process according to the present invention, the molasses used as starting material is adjusted to a pH of 1–4 with, for example, hydrochloric acid and heated for 20 minutes to 2 hours at a temperature of 60–105° C., it thereby being advantageous to heat for a period of time which is longer than that necessary for the complete hydrolysis (inversion) of the sucrose. Particularly favorable results are obtained when, in addition, sulfur dioxide is passed into the solution before, during or after the hydrolysis. Furthermore, the hydrolysis can also be carried out exclusively with the use of sulfur dioxide.

After the hydrolysis, the reaction mixture is expediently neutralized with sodium hydroxide solution, potassium hydroxide solution or with the help of a weakly basic ion exchanger and the molasses pre-treated in this manner passed over a cation exchanger column in the salt form. For this purpose, there is preferably used an exchanger resin charged with potassium or sodium ions, for example, a nuclear-sulfonated polystyrene resin cross-linked with 4% divinyl-benzene.

The separation of the molasses solution, pre-treated according to the present invention, by the exclusion process takes place, for example, by applying the warmed solutions which are preferably no more dilute than is necessary, to a suitably dimensioned exchange resin column and then washed through the column with pure water at a suitable rate of application. At the end of the column, there first emerge the salts, then, possibly together with the salts, the coloring matter, as well as the nitrogen-containing compounds. When the column is sufficiently long, then, after an interval which is practically free of material, the mixture of monoses, with glucose and fructose as the main components, emerges from the column in an almost colorless form.

The concentration of the molasses solutions to be separated should amount to 20–70% by weight of dry matter, preferably about 50% by weight of dry matter, the lower limit only, being determined by the economy of the process and the upper limit by the viscosity. The temperature used is between 50 and 100° C., preferably between 60 and 90° C. The lower temperature limit is determined by the slower velocity of the exchange process and by the possibility of bacterial growth and the upper temperature limit by the boiling point of the solvent, water. However, in principle, within the stability limits of the sugar solutions and of the exchange resin, it is possible to work under a super-atmospheric pressure and, therefore, at a temperature above 100° C.

The substantially salt-free and only very weakly colored solutions of monoses, preponderantly mixtures of substantially equal amounts of glucose and fructose (invert sugar) obtained by the process according to the present invention can, possibly after concentration, be used for many purposes in the foodstuff industry in which previously there had only been used invert sugar produced from sucrose or glucose alone, as for example, in the confectionery industry, in the conserve industry and in breweries. However, the invert sugar solutions obtained by the process according to the present invention can also be subjected to known separation processes in order to obtain therefrom fructose and glucose as pure products, for example, fructose by the calcium fructosate process or fructose and glucose by the ion exclusion process.

In accordance with a modification of the process according to the present invention, it has also been found that the sugar components can be obtained from molasses almost completely in the form of a pure invert sugar solution when, after the acidic hydrolysis of the molasses and without neutralization, the hydrolysis product is separated chromatographically, in known manner, on a cation exchanger column in the salt form.

In the case of the chromatographic separation of acidic molasses hydrolyzate solutions on cation exchanger columns in the salt form, the salts are washed out of the exchange column until an equilibrium has been reached and the metal cations replaced by hydrogen ions. Therefore, it is preferred to use cation exchangers which, in addition to their content of cations, are also charged with hydrogen ions in an amount which corresponds as nearly as possible to the equilibrium concentration in the molasses hydrolyzate solutions in question.

Apart from the saving of lyes for the neutralization of the hydrolyzate, this variation of the process according to the present invention possesses the advantage that organic acids, such as the aconitic acid present in cane-sugar molasses, can be recovered, these being lost in the case of the separation of neutralized hydrolyzate solutions.

The hydrolysis is preferably carried out with sulfuric acid, which is less corrosive than hydrochloric acid and, furthermore, precipitates out considerable amounts of calcium sulfate slurry which, together with other slimy impurities in the molasses, can be separated quite easily.

For this modification of the process according to the present invention, there can, in principle, be used those exchange resins which have already been mentioned above. Thus, for example, nuclear-sulfonated polystyrene resins, cross-linked with 4% divinyl-benzene and charged with sodium or potassium ions, such as "Dowex" 50W-X4, have proved to be particularly useful ("Dowex" is a registered trademark). In order to avoid unnecessary elutions of salts, there are used, depending upon the pH value of the hydrolyzate, exchanger columns which contain about 2–10% hydrogen ions, in addition to 90–98% metal cations.

A more comprehensive understanding of the invention can be obtained by referring to the following illustrative examples which are not intended, however, to be unduly limitative of the invention.

Example 1

270 g. of molasses consisting of about 85% dry material, about 50% sucrose, 5.3% glucose, 6.6% fructose, 3.48% potassium, 2.1% chlorine and 5.9% ash, were diluted with 170 cc. water and heated to 80° C. After the addition of 38.3 cc. 6 N hydrochloric acid, the resulting solution was stirred for 60 minutes at 80° C. This solution was then cooled to 20° C., neutralized with about 30 cc. 8.2 N potasssium hydroxide solution, centrifuged for 1 hour at about 3000 r.p.m. and decanted off from the separated precipitate. The separated solution was concentrated in a vacuum to 370 cc. (470 g.), heated to 90° C. and then applied to the separating apparatus as hereinafter described.

The separating apparatus consisted of three glass tubes, each having a length of 200 cm. and an internal diameter of about 3.5 cm. and were each surrounded by a heating jacket having a length of about 190 cm. through which water at 90° C. was pumped throughout the separation. The columns were connected by means of glass tubes having a diameter of about 4 mm., the flow-through rate of which could be regulated so that the solution applied to the first column could flow through the three columns, one after the other, in a uniform stream. The level difference between the columns amounted to about 40 cm. Each column contained 1500 cc. exchanger, i.e., a nuclear-sulfonated polystyrene resin cross-linked with 4% divinyl-benzene ("Dowex 50W–X4") in the potassium form. The particle size of the resin was 50–100 mesh. The column was filled with water to such an extent that the resin particles were completely submerged. The filling height was then 150 cc. The solution to be separated was applied to the first column at a temperature of 90° C., and a flow-through velocity of about 10 cc./minute was adjusted for the three columns. After all of the solution had passed into the column filled with exchanger, elution was carried out at the same velocity using water at 90° C.

The solution which emerged from the lower end of the third column was collected in 90 cc. fractions. The first 19 fractions which emerged only contained water and were discarded. Each of the following fractions (about 30) were separately analyzed for glucose, fructose or sucrose, chlorine and non-sugars. Furthermore, the extinction values were determined. The following methods of investigation were used:

glucose—enzymatic determination using glucose-oxidase.
fructose—determined using resorcinol-hydrochloric acid.
sucrose—after hydrolysis with hydrochloric acid, the glucose was determined enzymatically.
non-sugars—dry substance (determined by drying the samples at 60° C. in a vacuum), less total sugars.
chlorine—determined by titration with silver nitrate.
extinction—after appropriate dilution of the samples with water, the extinction E was measured in an electrophotometer (Elko II—Carl Zeiss) using an S 42 E filter having an 0.5 cm. layer thickness and calculated back to the undiluted samples.

The results of these analyses are summarized in the following Table I.

TABLE I

| Fraction No. | Glucose (g.) | Fructose (g.) | Non-sugars (g.) | Chlorine (g.) | Extinction (420 mμ, 0.5 cm. layer thickness) |
|---|---|---|---|---|---|
| 20 | | | 0.03 | | 0.035 |
| 21 | | | 0.09 | | 0.342 |
| 22 | | | 0.45 | 0.0083 | 1.35 |
| 23 | | | 0.74 | 0.0346 | 2.43 |
| 24 | | | 0.94 | 0.0757 | 3.22 |
| 25 | | | 1.64 | 0.1323 | 3.98 |
| 26 | | | 1.83 | 0.1912 | 5.42 |
| 27 | | | 2.46 | 0.2871 | 5.44 |
| 28 | | | 2.85 | 0.3724 | 5.88 |
| 29 | | | 3.46 | 0.5001 | 6.46 |
| 30 | | | 3.90 | 0.6139 | 5.80 |
| 31 | | | 4.37 | 0.7937 | 4.88 |
| 32 | | | 4.72 | 0.9498 | 3.86 |
| 33 | | | 5.33 | 1.2067 | 3.82 |
| 34 | | | 5.58 | 1.4196 | 2.86 |
| 35 | | | 6.23 | 1.6976 | 3.22 |
| 36 | 0.01 | | 6.94 | 1.8199 | 4.38 |
| 37 | 0.04 | 0.15 | 8.18 | 2.0036 | 8.48 |
| 38 | 0.39 | 0.37 | 7.35 | 1.4384 | 12.84 |
| 39 | 4.32 | 1.13 | 1.38 | 0.0871 | 2.54 |
| 40 | 8.46 | 2.87 | 0.84 | 0.0150 | 1.32 |
| 41 | 12.98 | 6.32 | 0.80 | 0.0051 | 0.975 |
| 42 | 14.00 | 10.85 | 0.75 | nil | 0.830 |
| 43 | 14.61 | 15.86 | 0.58 | | 0.675 |
| 44 | 12.15 | 17.33 | 0.32 | | 0.620 |
| 45 | 8.58 | 16.75 | | | 0.525 |
| 46 | 4.35 | 10.99 | | | 0.445 |
| 47 | 1.41 | 6.12 | | | 0.375 |
| 48 | 0.26 | 1.86 | | | 0.295 |
| 49 | 0.04 | 0.39 | | | 0.280 |
| 50 | 0.01 | 0.11 | | | 0.245 |
| | 81.61 | 91.10 | 71.76 | 13.6521 | |

*Comparative experiment with non-hydrolyzed molasses.*—270 g. of the same molasses were dissolved in 170 cc. water, adjuster to pH 7 with about 6 cc. of 2 N potassium hydroxide solution, centrifuged for 1 hour at about 3000 r.p.m., decanted from separated sludge (5–8 g. dry material, heated to 90° C. and supplied to the same separating apparatus. The emergent fractions were collected on the same way and thereafter analyzed. The results obtained are summarized in the following Table II.

TABLE II

| Fraction No. | Glucose (g.) | Fructose (g.) | Sucrose (g.) | Non-sugars (g.) | Chlorine (g.) | Extinction (420 mμ, 0.5 cm. layer thickness) |
|---|---|---|---|---|---|---|
| 20 | | | | 0.04 | | 0.172 |
| 21 | | | | 0.36 | | 1.09 |
| 22 | | | | 0.91 | 0.0070 | 2.53 |
| 23 | | | | 1.50 | 0.0230 | 3.55 |
| 24 | | | | 1.96 | 0.0536 | 4.55 |
| 25 | | | | 2.52 | 0.0989 | 5.41 |
| 26 | | | | 2.97 | 0.1510 | 5.98 |
| 27 | | | | 3.29 | 0.2177 | 6.06 |
| 28 | | | | 3.78 | 0.3031 | 5.91 |
| 29 | | | | 3.96 | 0.3988 | 5.58 |
| 30 | | | 0.04 | 4.37 | 0.5042 | 4.37 |
| 31 | | | 0.27 | 4.68 | 0.5999 | 5.18 |
| 32 | | | 1.45 | 5.03 | 0.6861 | 4.41 |
| 33 | | | 3.61 | 5.39 | 0.7786 | 4.56 |
| 34 | | | 7.24 | 5.63 | 0.8201 | 7.48 |
| 35 | | | 14.28 | 3.72 | 0.5265 | 10.04 |
| 36 | 0.02 | | 25.9 | 0.81 | 0.1228 | 4.13 |
| 37 | 0.10 | | 27.8 | 0.67 | 0.0214 | 1.45 |
| 38 | 0.30 | 0.37 | 27.9 | 0.73 | nil | 0.97 |
| 39 | 1.20 | 1.47 | 17.1 | 0.91 | | 0.570 |
| 40 | 3.34 | 1.89 | 3.83 | 0.71 | | 0.340 |
| 41 | 4.32 | 3.59 | 0.53 | | | 0.360 |
| 42 | 3.67 | 4.55 | 0.25 | | | 0.285 |
| 43 | 1.75 | 4.78 | 0.34 | | | 0.225 |
| 44 | 0.46 | 2.83 | | | | 0.190 |
| 45 | 0.04 | 0.87 | | | | 0.205 |
| 46 | 0.01 | 0.21 | | | | 0.130 |
| 47 | 0 | 0.05 | | | | 0.105 |
| | 15.21 | 20.61 | 130.45 | 53.94 | 5.3127 | |

From the results set out in Table I and II, there can clearly be seen the advantages of the process according to the present invention over the process according to U.S. Pat. No. 3,174,876.

Whereas in the instance of the separation of the previously hydrolyzed molasses, only about 4% of the total invert sugar (Table I, fractions 37–39) was still heavily contaminated (the content of non-sugars amounts to about 73%), in the instance of the non-hydrolyzed molasses, the impulse sucrose fractions first running off (Table II, fractions 31–35) contained about 20% of the entire sucrose (content of non-sugars about 48%). Furthermore, in the case where the hydrolyzed molasses was used, the dark colored materials, together with the non-sugars, were substantially more readily separated so that in the case of about 90% of the total invert sugar, the extinction value fell below 1.0 (Table I, fractions 41–50). On the other hand, the sucrose fractions of the comparative experiment were several times more darkly colored. Thus, for example, in the case of 40% of the sucrose, the extinction value was above 4.0 and in the case of 60% of the sucrose, the extinction value was above 1.0 (Table II, fractions 31–36 and 37).

Example 2

The relationship of the discoloration of the ion exchanger to the hydrolysis conditions and to the molasses used was determined by the following simplified experiments, in connection with which analysis of the eluates was omitted:

270 g. amounts of molasses were dissolved in 130 cc. water, heated under reflux at the temperature as set out in Table III, mixed with 34 cc. 6 N hydrochloric acid (ph about 2), cooled to 20° C. following the period of time indicated in Table III and neutralized with 9 N potassium hydroxide solution. A comparative experiment was carried out with a solution of 270 g. molasses which had not been hydrolyzed in 170 cc. water. All of the solutions were centrifuged for 1 hours at about 3000 r.p.m., decanted off from the separated sludge (about 8 g. dry material), heated to 90° C. and applied to a column which consisted of a long glass tube having a length of approximately 100 cm. and a diameter of 3.5 cm, and which was surrounded by a heating jacket through which water could be pumped at a temperature of 90° C. The exchanger packing had a depth of 70 cm. and consisted of about 700 cc. of a particulate exchanger resin (for example "Dowex" 50W–X4) in the potassium form, having a particle size or 50–100 mesh, the exchanger being covered with water. The molasses solutions were filtered through the column at a rate of flow of about 10 cc./minute. After the entire amount of solution had penetrated into the exchanger resin, elution was carried out with about 1.3 litres water until the eluate contained less than 0.5/ by weight of dry matter. For the determination of the resin discoloration, the entire amount of the resin was removed from the column thoroughly mixed and a sample suction filtered. Using an electrophotometer (Elko II, Carl Zeiss), the extinction of the sample was measured with a green filter VG 9 at a layer thickness of 1 cm. against an identical sample of fresh exchanger resin. For carrying out the measurement, the resin particles were slurried with water in the cuvette and covered with about 2 mm. water.

In Table IV, there are summarized the analytical values obtained, from a comparison of which it can be seen that no deterioration of the separation effect occurred and the ion exchanger could be used over a long period of time for separation without regeneration being necessary.

TABLE IV

| Fraction No. | Invert sugar (g.) | | Conductivity (ms./cm.) at 23° C. | | Chlorine, g. | | Extinction (420 mµ, 0.5 cm. layer thickness) | |
|---|---|---|---|---|---|---|---|---|
| | Expt. 20 | Expt. 32 | Expt. 20 | Expt. 32 | Expt. 20 | Expt. 32 | Expt. 20 | Expt. 32 |
| 20 | | | 1.30 | 0.84 | 0.0098 | 0.0016 | 1.31 | 1.20 |
| 21 | | | 3.04 | 2.37 | 0.0346 | 0.0214 | 2.24 | 2.50 |
| 22 | | | 5.0 | 4.37 | 0.0717 | 0.0554 | 3.02 | 3.34 |
| 23 | | | 7.8 | 6.5 | 0.1253 | 0.0971 | 3.96 | 4.00 |
| 24 | | | 10.9 | 9.2 | 0.1903 | 0.1713 | 5.48 | 5.93 |
| 25 | | | 15 | 13.0 | 0.2788 | 0.2492 | 7.04 | 7.21 |
| 26 | | | 20 | 17.3 | 0.3906 | 0.3615 | 7.06 | 7.25 |
| 27 | | | 26.5 | 22.1 | 0.5256 | 0.4964 | 6.28 | 6.89 |
| 28 | | | 33 | 27.9 | 0.6872 | 0.6557 | 5.52 | 4.98 |
| 29 | | | 39 | 34 | 0.8859 | 0.8370 | 4.44 | 4.52 |
| 30 | | | 47 | 40.8 | 1.0913 | 1.0724 | 3.78 | 3.76 |
| 31 | | | 57 | 48.8 | 1.3631 | 1.3209 | 3.36 | 3.02 |
| 32 | | | 66 | 57 | 1.6498 | 1.6159 | 3.24 | 3.11 |
| 33 | 0.01 | 0.01 | 75 | 66 | 1.9547 | 1.9258 | 3.68 | 3.29 |
| 34 | 0.16 | 0.10 | 78 | 71 | 2.0516 | 2.1720 | 5.85 | 4.64 |
| 35 | 1.72 | 1.44 | 60 | 58 | 1.0592 | 1.2809 | 11.55 | 9.68 |
| 36 | 7.30 | 5.32 | 20 | 24.6 | 0.1297 | 0.2220 | 9.40 | 8.98 |
| 37 | 15.58 | 13.80 | 5.1 | 7.0 | 0.0162 | 0.0162 | 5.48 | 6.38 |
| 38 | 22.41 | 21.75 | 1.3 | 1.72 | 0.0040 | 0.0055 | 2.85 | 3.64 |
| 39 | 27.01 | 27.72 | 0.50 | 0.62 | Nil | 0.0012 | 1.77 | 2.06 |
| 40 | 25.33 | 30.48 | 0.33 | 0.31 | | Nil | 1.31 | 1.46 |
| 41 | 17.82 | 23.01 | 0.32 | 0.27 | | | 0.97 | 0.99 |
| 42 | 9.12 | 7.95 | 0.32 | 0.30 | | | 0.74 | 0.72 |
| 43 | 3.06 | 1.24 | 0.32 | 0.24 | | | 0.63 | 0.59 |
| 44 | 0.87 | 0.27 | 0.23 | 0.19 | | | 0.53 | 0.53 |
| 45 | 0.21 | 0.14 | 0.19 | 0.17 | | | 0.48 | |
| | 130.60 | 133.23 | | | 13.4184 | 12.5794 | | |

When the starting molasses fraction had the following composition:

| | Percent |
|---|---|
| Dry matter | About 83 |
| Sucrose | 38.4 |
| Glucose | 6.1 |
| Fructose | 6.7 |
| Potassium | 4.6 |
| Chlorine | 2.44 |
| Ash | 7.2 | there were obtained the results summarized in the following Table III:

TABLE III

| Experiment | Treatment of the molasses | Extinction of the exchanger after elution |
|---|---|---|
| a | Without hydrolysis | 0.870 |
| b | Hydrolyzed for 60 minutes at 80° C | 0.794 |
| c | Hydrolyzed for 30 minutes at 100° C | 0.695 |
| d | Hydrolyzed for 60 minutes at 100° C | 0.605 |
| e | Hydrolyzed for 30 minutes at 100° C., 10 g. sulfur dioxide passed in 5 minutes. | 0.475 |

Example 3

270 g. of the same molasses used in Example 2 were dissolved in 170 cc. water, heated under reflux at 100° C., mixed with 32.9 cc. 6 N hydrochloric acid (pH 2.2) and stirred for 15 minutes at 100° C. In the course of 10 minutes, about 10 g. sulfur dioxide were passed in, stirring continued for 5 minutes at 100° C. and the reaction mixture then cooled to 20° C. It was thereafter neutralized with about 27.5 cc. 8 N potassium hydroxide solution, centrifuged for 1 hour at about 3000 r.p.m. and decanted off from the separated sludge (about 25 g. moist weight). The solution of the hydrolyzate (380 cc.=474 g.) was separated into non-sugars and invert sugar in the manner described in Example 1.

For testing the constancy of the separation effect, the above separation experiment was repeated 32 times in succession in the same manner and with the same exchanger resin. From the twentieth and thirty second experiment, the individual fractions 20–45 were examined for the invert sugar and chlorine content and were also measured for conductivity and extinction value.

Example 4

270 g. molasses having the following composition:

| | Percent |
|---|---|
| Dry matter | About 83 |
| Sucrose | 38.8 |
| Glucose | 5.4 |
| Fructose | 7.3 |
| Chlorine | 2.30 |
| Sulfate | 1.50 |
| Ash | About 7.2 | were dissolved in 170 cc. water, heated under reflux at 100° C., mixed with 32.5 cc. 6 N sulfuric acid (pH 2.8) and hydrolyzed for 30 minutes at 100° C. This hydrolysis mixture was thereafter cooled to about 25° C., centrifuged for 1 hour at about 3000 r.p.m., and decanted off from the separated sludge. The latter was then stirred up with 15 cc. water and filtered with suction (dry substance 15.38 g.=10.33 g. ash, and consisted essentially of calcium sulfate). The acidic solution of the hydrolyzate (375 cc.=457 g.) was heated to 60° C. and then applied to the separation apparatus as described in the following:

The separation apparatus consisted of three glass tubes, each having a length of 200 cm. and an internal diameter of about 3.5 cm., and which were surrounded by a heating jacket having a length of about 190 cm., through which water at a temperature of 60° C. was pumped during the separation. The columns were connected together by glass tubes having a diameter of about 4 mm., the flow-through rate of which could be regulated so that the solution applied to the first column would flow downwardly in a uniform current through the three successive columns. The level difference between the columns amounted to about 40 cm. Each column contained about 1500 cc. cation exchanger, and namely, a nuclear-sulfonated polystyrene resin cross-linked with 4% divinyl-benzene ("Dowex 50W-X4), which was loaded to an extent of 94–95% with potassium ions and was in equilibrium at 60° C. with the molasses hydrolyzate solution. The particle size of the exchange resin was 50–100 mesh. The column was filled with water to such an extent that the resin particles were completely submerged. The filling height amounted to 150 cm. The solution to be separated was applied at 60° C. to the first column. The flow-through velocity was adjusted to about 10 cc./minute in the three columns. After all of the solution had penetrated into the exchanger filling, elution was carried out at the same rate with water at a temperature of 60° C.

The solution emerging from the lower end of the third column was collected in 90 cc. fractions. The first nineteen fractions which emerged contained only water and were discarded. There then followed about 32 fractions, each of which was separately analyzed for glucose, fructose, chlorine and sulfate. In addition, the extinction, the conductivity and the refractive index were determined for each fraction. The acidity was titrated and, in the case of fractions 40 and 51, the content of aconitic acid was determined by paper chromatography. The following investigational methods were utilized:

glucose—enzymatic determination with glucose oxidase.
fructose—determination with resorcinol-hydrochloric acid.
chlorine—determination by titration with silver nitrate.
sulfate—determination as barium sulfate precipitate.
extinction—after appropriate dilution of the samples with water, the extinction E was measured in an electrophotometer (Elko II—Carl Zeiss) using an S 42 E filter having an 0.5 cm. layer thickness and calculated back to the undiluted samples.
refractive—determined with an Abbé refractometer (Carl Zeiss) index $n_D$ at 20° C.
electrical—determined with a conductivity measuring device conductivity in ms./cm. at 23° C.

The results of these analyses are summarized in the following Table V. As can be seen therefrom, the nonsugar materials were substantially separated from the invert sugar. The last fractions of the invert sugar still contained aconitic acid which, however, could be easily separated and isolated with a weakly basic ion exchanger. In general, the pure invert sugar solutions so obtained contained, apart from glucose and fructose, small amounts of other hexoses and pentoses which, nevertheless, do not impair the intended use of the invert sugar or can be separated in a further working step.

said hydrolyzed molasses with a cation charged ion exchanger in salt form.

2. Process according to claim 1 wherein the acid hydrolysis is carried out for a period of time in excess of that necessary to effect complete hydrolysis of the sucrose present in said molasses to glucose and fructose.

3. Process according to claim 1 which comprises contacting said molasses prior to, during or after said hydrolysis with sulfur dioxide.

4. Process according to claim 1 wherein said hydrolysis is effected by contacting said molasses with sulfuric acid.

5. Process according to claim 1 wherein said contacting is carried out under superatmospheric pressure at a temperature above 100° C.

6. Process according to claim 1 wherein said contacting is carried out at a temperature of from 50 to 100° C.

7. Process according to claim 6 wherein said contacting is carried out at a temperature of from 60 to 90° C.

8. Process according to claim 1 wherein said cation charged ion exchanger in salt form is a nuclear-sulfonated polystyrene resin cross-linked with 4% divinyl-benzene and charged with a member selected from the group selected from sodium and potassium ions.

9. Process according to claim 8 wherein said cation charged ion exchanger contains about 90–98% metal cations and about 2–10% hydrogen ions.

10. Process according to claim 1 wherein said hydrolyzed molasses is contacted with said cation exchange resin and the salts washed out until equilibrium has been reached and the metal cations replaced by hydrogen ions.

11. Process according to claim 10 wherein said cation exchange resin is additionally charged with hydrogen ions.

12. Process according to claim 11 wherein said hydrogen ions are present in an amount substantially corresponding to the equilibrium concentration of said hydrolyzed molasses.

13. Process according to claim 1 wherein said hydrolyzed molasses is neutralized prior to said contacting with said ion exchanger.

TABLE V

| Fraction No. | Invert sugar (g.) | Chlorine (g.) | Sulfate (SO₄) (g.) | Use of 1N NaOH (cc.) | Aconitic acid (g.) | Conductivity ms./cm. at 23° C. | Extinction 420 mμ 0.5 cm. layer thickness | Refractive index 20$_D$ⁿ |
|---|---|---|---|---|---|---|---|---|
| 20 | | 0.0089 | 0.0337 | 0.13 | | 1.58 | 0.084 | 1.3336 |
| 21 | | 0.0362 | 0.0611 | 0.45 | | 4.35 | 0.142 | 1.3341 |
| 22 | | 0.0895 | 0.0987 | 0.78 | | 7.55 | 0.170 | 1.3344 |
| 23 | | 0.1440 | 0.1504 | 1.22 | | 11.1 | 0.200 | 1.3349 |
| 24 | | 0.2047 | 0.2109 | 1.67 | | 15.1 | 0.207 | 1.3354 |
| 25 | | 0.2806 | 0.2763 | 2.35 | | 19.8 | 0.289 | 1.3359 |
| 26 | | 0.3738 | 0.3318 | 3.05 | | 25.0 | 0.431 | 1.3363 |
| 27 | | 0.4500 | 0.4637 | 3.92 | | 31.1 | 0.358 | 1.3364 |
| 28 | | 0.5399 | 0.5674 | 4.87 | | 37.2 | 0.250 | 1.3366 |
| 29 | | 0.6444 | 0.6938 | 6.18 | | 45.0 | 0.196 | 1.3371 |
| 30 | | 0.7832 | 0.8694 | 7.65 | | 53.3 | 0.198 | 1.3378 |
| 31 | | 0.9129 | 1.0356 | 9.35 | | 62.0 | 0.270 | 1.3384 |
| 32 | | 1.0235 | 1.1222 | 11.21 | | 70.5 | 0.460 | 1.3393 |
| 33 | | 0.4050 | 0.7992 | 13.46 | | 39.2 | 2.40 | 1.3391 |
| 34 | | 0.0089 | 0.0058 | 6.76 | | 4.04 | 1.58 | 1.3359 |
| 35 | 0.27 | Nil | Nil | 3.51 | | 2.37 | 1.33 | 1.3358 |
| 36 | 1.54 | | | 2.64 | | 1.63 | 1.14 | 1.3377 |
| 37 | 4.90 | | | 2.40 | | 1.60 | 1.01 | 1.3430 |
| 38 | 10.09 | | | 2.40 | | 1.53 | 0.900 | 1.3512 |
| 39 | 16.55 | | | 2.43 | | 0.88 | 0.870 | 1.3610 |
| 40 | 21.74 | | | 2.73 | | 0.75 | 0.830 | 1.3698 |
| 41 | 26.40 | | | 3.38 | 0.1 | 0.70 | 0.800 | 1.3772 |
| 42 | 26.09 | | | 4.09 | 0.1 | 0.74 | 0.770 | 1.3778 |
| 43 | 19.96 | | | 5.49 | 0.1 | 1.00 | 0.680 | 1.3681 |
| 44 | 9.45 | | | 6.09 | 0.1 | 1.54 | 0.620 | 1.3513 |
| 45 | 2.16 | | | 9.17 | 0.15 | 2.12 | 0.600 | 1.3395 |
| 46 | 0.35 | | | 12.19 | 0.3 | 2.51 | 0.570 | 1.3363 |
| 47 | 0.09 | | | 17.36 | 0.55 | 2.95 | 0.550 | 1.3362 |
| 48 | 0.05 | | | 21.42 | 0.6 | 3.29 | 0.575 | 1.3362 |
| 49 | 0.04 | | | 21.74 | 0.7 | 3.32 | 0.635 | 1.3361 |
| 50 | | | | 15.09 | 0.6 | 2.75 | 0.895 | 1.3358 |
| 51 | | | | 5.64 | 0.1 | 1.36 | 1.055 | 1.3348 |
| | 139.68 | 5.9055 | 6.8100 | 211.72 | 3.40 | | | |

We claim:

1. Process for recovering substantially pure invert sugar from molasses which comprises subjecting molasses to an acid hydrolysis and directly thereafter-contacting 14. Process according to claim 13 wherein said acid hydrolysis is effected by adjusting the pH of said molasses to a value of from 1–4 with hydrochloric acid and thereafter conducting said hydrolysis for from 20 minutes to 2 hours at a temperature of from 60–105° C.

15. Process according to claim 13 wherein said hydrolysis is effected by contacting said molasses with sulfur dioxide.

16. Process according to claim 13 wherein said neutralization is effected by contacting said hydrolyzed molasses with a solution of an alkali hydroxide.

17. Process according to claim 16 wherein said alkali hydroxide is a member selected from the group consisting of sodium and potassium hydroxide.

18. Process according to claim 13 wherein said neutralization is effected by contacting said hydrolyzed molasses with a weakly basic ion exchanger.

19. Process according to claim 18 wherein said weakly basic ion exchanger is charged with a member selected from the group consisting of sodium and potassium ions.

References Cited

UNITED STATES PATENTS

| | | | |
|---|---|---|---|
| 1,494,218 | 5/1924 | Cutler | 127—46 |
| 2,007,971 | 7/1935 | Jackson | 127—30 X |
| 2,459,991 | 1/1949 | Capdevielle | 127—41 X |
| 2,504,169 | 4/1950 | Wolfrom et al. | 127—42 X |
| 2,534,694 | 12/1950 | Blann | 127—46.1 X |
| 2,890,972 | 6/1959 | Wheaton | 127—46.2 |
| 2,937,959 | 5/1960 | Reents et al. | 127—46 |
| 2,946,706 | 7/1960 | Boon et al. | 127—1 X |
| 3,174,876 | 3/1965 | Stark | 127—46 |

FOREIGN PATENTS

| | | |
|---|---|---|
| 1,128,218 | 1/1957 | France. |
| 93,007 | 6/1897 | Germany. |
| 527,246 | 10/1921 | France. |

MORRIS O. WOLK, Primary Examiner

D. G. CONLIN, Assistant Examiner

U.S. Cl. X.R.

127—30, 36, 46

UNITED STATES PATENT OFFICE
CERTIFICATE OF CORRECTION

Patent No. 3,511,705              Dated May 12, 1970

Inventor(s)   Erich Haack et al.

It is certified that error appears in the above-identified patent and that said Letters Patent are hereby corrected as shown below:

Column 8, line 18, "evaluates" should read -- eluates --; line 23, "ph" should read -- pH --; line 72, "/" should read -- % --. Column 10, Table IV, last column, 5th item in body "5.93" should read -- 5.92 --. Column 11, Table V, 3rd column, 13th item, body of Table "1.222" should read -- 1.2122 --. Column 4, line 15, "splititing" should read -- splitting --. Column 7, Table 1, last column, 7th item in body of Table "5.42" should read -- 4.52 --; line 35, "supplied" should read -- applied --; line 37, "on" should read -- in --; Table II, third total "130.45" should read -- 130.54 --; line 65, "Table" should read -- Tables --.

Signed and sealed this 29th day of December 1970.

(SEAL)
Attest:

EDWARD M. FLETCHER, JR.
Attesting Officer

WILLIAM E. SCHUYLER, JR.
Commissioner of Patents